Feb. 13, 1973   C. F. BENNETT   3,715,851
ANCHOR BOLT ASSEMBLY
Original Filed March 13, 1969
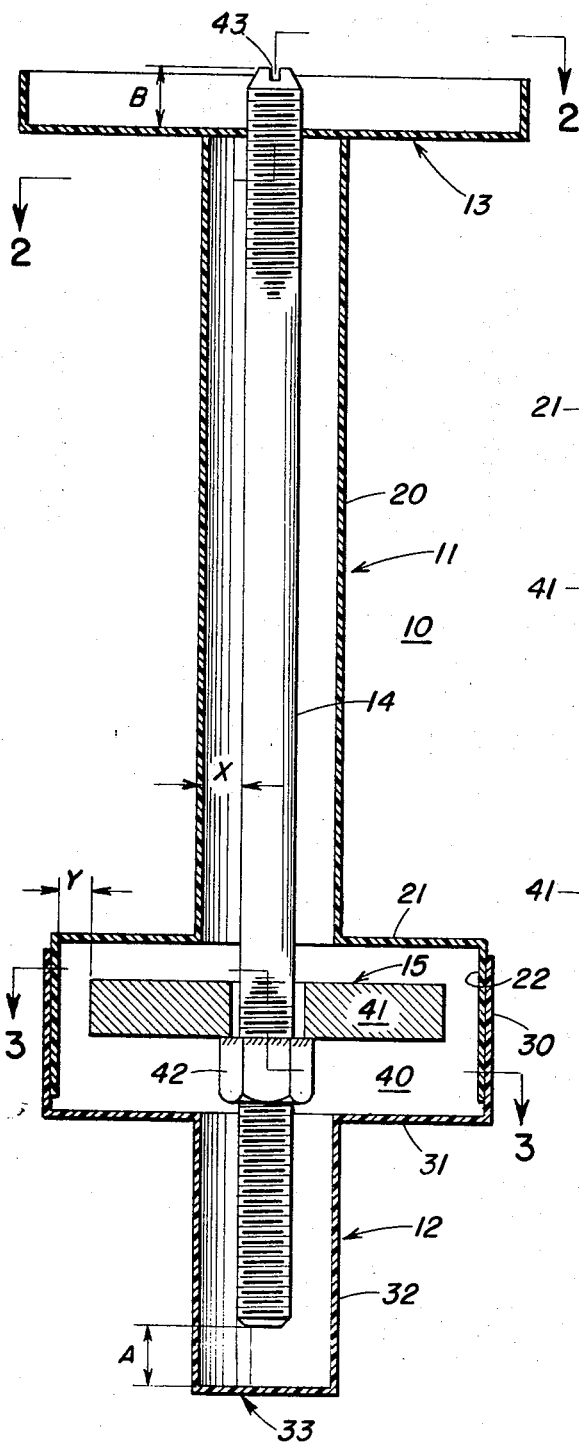
Fig. 1.
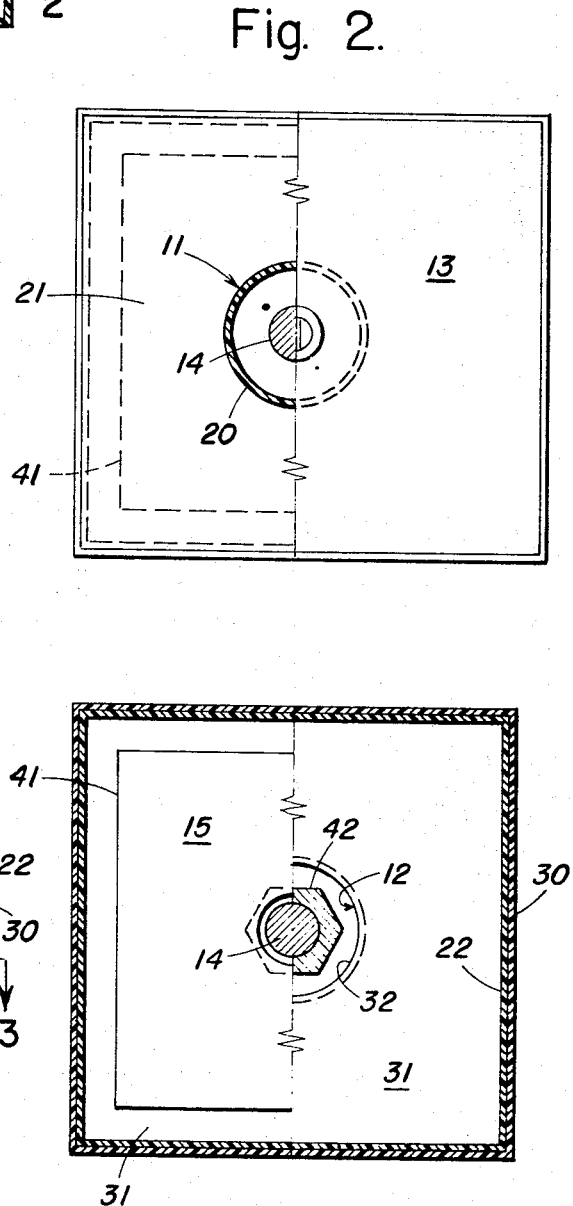
Fig. 2.
Fig. 3.
INVENTOR.
Charles F. Bennett
BY *Charles F. Bennett*
*Marn & Jangarathis*
ATTORNEYS

United States Patent Office 3,715,851
Patented Feb. 13, 1973

3,715,851
ANCHOR BOLT ASSEMBLY
Charles F. Bennett, 1325 Locust Ave.,
Bohemia, N.Y. 11716
Continuation of abandoned application Ser. No. 807,770,
Mar. 13, 1969. This application May 7, 1971, Ser.
No. 141,345
Int. Cl. E02d 5/74; E04b 1/38
U.S. Cl. 52—707                                  7 Claims

ABSTRACT OF THE DISCLOSURE

An anchor bolt assembly which is particularly useful for anchoring heavy machinery to bases or floors, such as a concrete floor, and which includes a sleeve member adapted to be embedded in the floor, and an anchor bolt or stud means positioned between restraining shoulders of the sleeve member.

---

This application is a continuation of application Ser. No. 807,770 filed Mar. 13, 1969 and now abandoned.

An object of this invention is to provide an anchor bolt assembly in which the anchor bolt or stud means is positioned within an anchoring sleeve member having restraining shoulders for limited axial movement for insertion and fixing to the base of machinery and in which positioning permits limited lateral adjustment relative to the anchoring sleeve member so as to align with openings in the base of the machinery and which can be readily tightened to clamp the machinery to the floor.

Another object of this invention is to provide an anchor bolt assembly in which the bolt or stud means positioned within the anchoring sleeve member is provided with means to permit the bolt or stud to be lowered to a position flush with or below the machinery supporting surface to allow for easy positioning of the machinery on the machinery supporting surface, as well as to permit the bolt to be raised through the mounting holes of the machinery once the machinery is in place.

Still another object of this invention is to provide an anchor bolt assembly which utilizes a long shank bolt under tension which can stretch and shrink with machinery and foundation vibrations with relatively minor change in hold-down force. The use of longer shank bolts provides relative uniform hold-down pressure without overloading the anchoring sleeve, the anchor bolt, or machinery base. This feature is also important in rotating machinery that may operate with a small amount of vibration but can pass through harmonic modes in gaining or losing speed which must be dampened by mass foundations.

Still another object of this invention is to provide an anchor bolt assembly using an anchoring sleeve member that is easy to position in concrete foundation reinforcing and is easy to secure by wiring to such reinforcing or by hanging from templates.

A further object of this invention is to provide a hollow anchoring sleeve member which, if desired, may be filled with a liquid that sets to a solid, such as concrete grout, or the like to secure the anchor bolt from lateral movement once the machinery is placed in position.

A further object of my invention is to provide an anchor bolt assembly wherein the anchor bolt is positioned axially within the anchoring sleeve member during alignment and is free to move therein 360 degrees.

A still further object is to provide an anchor bolt assembly which permits replacement of the bolt or stud.

Another object of my invention is to provide an anchor bolt assembly wherein the anchor bolt or stud is tapered to assure alignment with the base of the machinery within the limits of the anchoring sleeve member housing the anchor bolt or stud.

Still another object of my invention is to provide an anchor bolt assembly which is easy to house within the supporting surface and which does not require any cutting or welding, nor drilling or tapping of parts, nor painting.

A still further object of my invention is to provide an anchor bolt assembly wherein the anchor bolt is positioned within the anchoring sleeve member and wherein the sleeve member has a top portion which assures centering of the bolt or stud within the sleeve member as well as bolt clearance within the sleeve member. The top portion additionally prevents dirt, etc. from falling into the anchoring sleeve member.

Various additional objects or advantages will become apparent from the following description when together with the accompanying drawing wherein:

FIG. 1 is a vertical sectional view showing the anchor bolt assembly.

FIG. 2 is a horizontal sectional view taken along the line 2—2 of FIG. 1.

FIG. 3 is a horizontal sectional view taken along the line 3—3 of FIG. 1.

According to this invention, there is provided an anchoring sleeve member which is embedded in a concrete base or other machinery-supporting base. At a point intermediate its length, the anchoring sleeve member is provided with an extended portion of larger cross section than the main body of the anchoring sleeve member and forms a restraining means within the sleeve member. Positioned within the extended portion of the sleeve member is a substantially nonrotatable plate assembly provided with threaded means. The anchor bolt is threaded into the plate assembly which by virtue of the restraining means has limited axial movement, as more fully hereinafter discussed.

Once the machinery is positioned on respective anchoring sleeve assemblies, the anchor bolts are raised from the sleeve members by unthreading through the mounting holes of the machinery. Having attained a proper projection, nuts are then threaded on the respective anchor bolts and with an increasing upward tensile force, the anchor bolt is caused to be aligned within the sleeve member as a result of the action of the plate assembly as it engages the restraining shoulder or flange means of the anchoring sleeve member.

Referring now to the drawing, there is provided an anchor bolt assembly, generally indicated as 10, comprising an upper housing means 11, a lower housing means 12, a top 13, a tapered anchor bolt 14, and an anchor bolt plate assembly means, generally indicated as 15. The upper housing means 11, the lower housing means 12, and top 13 are preferably formed of a high compression plastic material, such as a polycarbonate, e.g., the polycarbonate sold under the trademark Merlon by Mobay Chemical Company.

The upper housing means 11 is formed of one piece and is comprised of cylindrically shaped top section 20, a square-shaped central section 21 perpendicularly extending from the top section 20, and a square-shaped bottom section 22 vertically extending downwardly from the central section 21. The length of the top section 20 of the upper housing 11, or the distance between the top 13 and the central section 21 of the upper housing 11 is determined by the tensile strength of the anchor bolt in relation to the bond value of the concrete.

The lower housing means 12 is also formed of one piece and is comprised of a square-shaped top section 30, a square-shaped central section 31 horizontally extending inwardly from the top section 30, a cylindrically shaped lower section 32 vertically extending from the central section 31, and a base 33.

The square-shaped top section 30 of the lower housing means 12 is heat sealed to the lower square-shaped bottom section 22 of the upper housing means 11, and forms an enlarged area 40. The central section 21 and the central section 31 of the upper and lower housing means 11 and 12, respectively, defining a portion of the enlarged area 40 are an important aspect of my invention as they form restraining means for the anchor bolt assembly means as more fully hereinafter described. It is understood, however, that any of the sections of the upper and lower housing means may take many forms, provided that restraining means are formed as a result of using such alternate forms.

Disposed within the area 40 is the plate assembly means 15 which is comprised of a plate 41 to which a nut 42, is affixed, such as by welding 43. The surface area of the plate 41 which will bear against the restraining means of the upper housing 11 formed by the central section 21 thereof is related to the tensile strength of the anchor bolt, the bearing value of the concrete and the cross-sectional area of the top section 20 of the upper housing means 11. The anchor bolt 14 having a slot 43 in one end thereof is threaded on the nut 42 of the plate assembly means 15, and as shown, is held by top 13 centrally within the upper and lower housing means. It will be understood that the top 13 does not rigidly hold the anchor bolt 14 in such position and that the bolt 14 and plate assembly 15 are free to move as a pendulum within the anchor bolt assembly 10 when the assembly is in a non-operative position.

As herein before mentioned, the upper and lower housing means may take many forms, however, there is one additional limitation, i.e., the plate assembly means 15 may only be limitally rotatable within the area 40.

The anchor bolt 14 is generally formed of steel, such as ASTM-307, or higher classification. The length of the anchor bolt is generally equal to the combined length of the upper and lower housing means, however, longer anchor bolts may be used as herein discussed. The anchor bolt 14 may be shorter than the combined length of such housing means but no shorter than the length of the top section 20 of the upper housing means 11, the depth of the area 40, and the depth of the threaded portion of the plate assembly means 15. Longer anchor bolts may also be used, however, such longer anchor bolts would not permit the same to be threaded flush with the supporting surface.

As hereinbefore described, the upper and lower housing means are formed respectively in one piece, however, it will be further understood that the housing means may be formed of more than one piece. In a preferred embodiment of my invention, the dimension A will equal B, as well as the dimension X equal to Y.

In operation, the assembly is positioned in the area which will form the machinery supporting surface or foundation, such as by wiring to reinforcing members, or by hanging from a template. It will be understood that a plurality of assemblies will be used to properly anchor any piece of machinery, however, for ease of description, reference will be made to only one of such assemblies. Upon setting of the material forming the foundation, a portion of the top 13 surrounding the anchor bolt 14 within the annular area formed by the top section 20 of upper housing means 11 is removed thereby causing the anchor bolt 14 and the anchor bolt plate assembly means 15 to fall within the upper and lower housing means until the anchor bolt 14 rests on the base 33 of the lower housing means 12 assuming the anchor bolt assembly means is vertically set within the surface of the foundation, at which point the anchor bolt 14 is flush with the surface of the foundation to permit the machinery to be slid or lowered onto the assembly. Unthreading the anchor bolt 14 within the anchor bolt plate assembly means 15 causes the plate assembly means 15 to be gradually lowered within the area 40, since the plate assembly means 15 is limitedly rotatable therein. The plate assembly means 15 eventually reaches the point where the plate assembly means 15 bears against the lower restraining means formed by the central section 31 of the lower housing 12 thereby causing the anchor bolt 14 to be vertically raised through the anchor bolt assembly 10 by further unthreading thereof. In this regard it should be noted that without a lower restraining means, unthreading of the anchor bolt 14 in the anchor bolt plate assembly means 15 would not result in the raising of the anchor bolt (except for manual lifting), but would reach a point where the anchor bolt 14 would become unthreaded from the plate assembly means 15. If the assembly 10 is in exact alignment with the anchor hole in the base of the machinery, the anchor bolt 14 will move vertically upwardly as the nut is tightened on the mounting lugs of the machinery until the plate 41 engages the restraining means formed by the central section 21 of the upper housing means 11. Should the assembly 10 be out of line with the hole in the base of the machinery, the anchor bolt 14 will align itself within the assembly 10. It can be readily seen as the anchor bolt 14 is unthreaded through the base of the machinery which is not in proper alignment with the assembly 10, the anchor bolt 14 will be at an angle with respect to the central axis of the assembly 10. Thus, when the nut is tightened on the anchor bolt, the plate assembly 15 will be raised from the supporting surface of the central section 31 of the lower housing means 12 and at the point where contact no longer exists between the plate assembly 15 and the housing means, true alignment of the anchor bolt and machinery is achieved.

It is understood that true axial alignment of the anchor bolt 14 with the machinery can only be obtained within the limits of the cross-sectional area of the top section 20 of the upper housing means 11. It will be readily appreciated that the anchor bolt 14 may be rethreaded into the assembly to permit the removal of the machinery. Additionally, the anchor bolt may be replaced if the need arises, such as with a bolt of greater tensile strength or with a longer bolt. Further, axial pull is guaranteed by use of my invention.

It will also be seen that an assembly may be made without an anchor bolt therein (but with the plate assembly) and without a hole in the top 13. Such an assembly would be similarly positioned in the area forming the proposed foundation. After placement of the machinery, the plastic portion of the top 13 coinciding with the top section 20 of the upper housing means 11 is removed and an anchor bolt of proper length inserted through a hole in the base of the machinery into the assembly 10. The anchor bolt is then threaded on the plate assembly until proper projection is obtained. A nut may thereafter be tightened on the anchor bolt.

What is claimed is:

1. An anchor bolt assembly which comprises: an elongated threaded means; a threaded bearing means into which said threaded means is threadably engaged, said bearing means positioned between the upper and lower ends of said threaded means; an upper housing surrounding that portion of the threaded means above the threaded bearing means, said upper housing having an internal dimension smaller than the external dimension of said bearing means; an intermediate top wall extending from said upper housing; a side wall extending from said intermediate top wall; an intermediate bottom wall extending from said side wall and forming an intermediate housing surrounding said threaded bearing means, said intermediate top and bottom walls having a spacial relationship therebetween greater than the thickness of said threaded bearing means, said side wall being dimensioned larger than said threaded bearing means and provided with restraining means to prevent said threaded bearing means from rotating during rotation of said threaded means and a lower housing extending from said intermediate bottom wall and surrounding said threaded means extending below said threaded bearing means, said lower housing having an internal dimension smaller than the external dimension of said bearing means, said elongated threaded means being threadably insertable downwardly into said upper housing to a point about the upper portion of said upper housing whereby said elongated threaded means is further extended into said lower housing.

2. The anchor bolt assembly as defined in claim 1 wherein the distance between said threaded means and said upper outer wall is substantially equal to the distance between the outer edge of said threaded bearing means and said intermediate outer wall.

3. The anchor bolt assembly as defined in claim 2 wherein the top of said upper outer wall is enclosed with a top portion through which extends said threaded means.

4. The anchor bolt assembly as defined in claim 3 wherein said threaded means extends a distance above the top of said upper outer wall equal to the distance said threaded means is disposed above the lower portion of said lower outer wall.

5. The anchor bolt assembly as defined in claim 1 wherein said elongated threaded bearing means is comprised of a plate to which is affixed a threaded nut.

6. The anchor bolt assembly as defined in claim 1 wherein said elongated threaded means is a threaded rod and is provided with a slotted means on the top thereof to permit the rotational movement of the elongated threaded means.

7. The anchor bolt assembly as defined in claim 1 wherein said upper, intermediate and lower housing are formed of a high impact plastic material.

References Cited

UNITED STATES PATENTS

| | | | |
|---|---|---|---|
| 913,875 | 3/1909 | Cleverdon et al. | 52—708 |
| 917,927 | 4/1909 | Cook | 52—708 |
| 2,952,947 | 9/1960 | White | 52—708 |
| 2,988,855 | 6/1961 | Asfour et al. | 52—704 |

FOREIGN PATENTS

| | | | |
|---|---|---|---|
| 664,178 | 6/1963 | Canada | 52—127 |
| 1,225,008 | 2/1960 | France | 248—483 |

JOHN E. MURTAGH, Primary Examiner

J. L. RIDGILL, Jr., Assistant Examiner

U.S. Cl. X.R.

248—463